US008821246B2

(12) United States Patent
Okuniewicz

(10) Patent No.: US 8,821,246 B2
(45) **Date of Patent: *Sep. 2, 2014**

(54) CO-LOCATED LOTTERY GAME FOR A GAMING DEVICE

(76) Inventor: Douglas M. Okuniewicz, Post Falls, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/190,448

(22) Filed: Jul. 25, 2011

(65) Prior Publication Data

US 2012/0196669 A1 Aug. 2, 2012

Related U.S. Application Data

(63) Continuation of application No. 10/789,325, filed on Feb. 27, 2004, now Pat. No. 7,985,129, which is a continuation of application No. 10/388,819, filed on Mar. 14, 2003, which is a continuation of application No. 09/834,537, filed on Apr. 13, 2001, now Pat. No. 6,585,589.

(60) Provisional application No. 60/196,827, filed on Apr. 13, 2000.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |
| *A63F 3/08* | (2006.01) |
| *A63F 1/00* | (2006.01) |

(52) U.S. Cl.

CPC ............ *G07F 17/32* (2013.01); *G07F 17/3202* (2013.01); *A63F 3/081* (2013.01); *G07F 17/329* (2013.01); *G07F 17/3248* (2013.01); *A63F 2001/008* (2013.01)

USPC .................. 463/17; 463/16; 463/25; 463/42; 463/43

(58) Field of Classification Search

USPC .................................. 463/16, 17, 25, 42, 43

See application file for complete search history.

(56) References Cited

U.S. PATENT DOCUMENTS

| | | | | |
|---|---|---|---|---|
| 4,833,307 | A * | 5/1989 | Gonzalez-Justiz | 235/375 |
| 6,685,563 | B1 * | 2/2004 | Meekins et al. | 463/25 |

* cited by examiner

*Primary Examiner* — Adetokunbo O Torimiro

(74) *Attorney, Agent, or Firm* — David E. Mixon; Bradley Arant Boult Cummings LLP

(57) ABSTRACT

A lottery system/slot machine interface has been developed. The interface includes an electronic detector to detect selected slot machine event occurrences and generate event occurrence notification signals upon detection of the selected events. The invention also includes an interface that detects the event occurrence notification signals, analyzes the signals and outputs a lottery entry command. Finally, a printer receives the lottery ticket printing commands and prints a lottery entry ticket.

1 Claim, 3 Drawing Sheets

CO-LOCATED LOTTERY GAME FOR A GAMING DEVICE

CROSS-REFERENCE TO RELATED APPLICATIONS

This continuation application claims priority to the filing date of a related provisional application Ser. No. 60/196,827 filed Apr. 13, 2000, related application Ser. No. 09/834,537 filed Apr. 13, 2001 and issued as U.S. Pat. No. 6,585,589 and related application Ser. No. 10/388,819 filed Mar. 14, 2003 and related application Ser. No. 10/789,325 filed Feb. 27, 2004.

FIELD OF THE INVENTION

The present invention relates to interface devices for electronic devices and, more particularly, to a lottery system/electronic gaming device interface and gambling game which is operative to signal the lottery system to issue an entry into the lottery when a preset event or series of events occurs in or around the gaming device.

BACKGROUND ART

Spinning reel slot machines, video slot machines and video poker machines continue to be three of the most widely used types of electronic gaming devices found in the gaming industry. While the types and designs of the slot machines and video poker machines have continued to evolve, game play has remained generally the same in that when a specific combination is hit on the reels or turned up in the cards, it produces particular winning combinations and payouts based on the pay table of the slot machine or video poker machine. With that in mind, many slot machine manufacturers have attempted to increase the excitement generated by game play by adding peripheral devices such as sound generators or video screens which promote increased game play by presenting entertaining accompaniments to the game play of the slot machine or video poker machine. The trend has continued in that many of the currently produced slot machines and video gaming devices include various bonus generators which are shown on the primary or accompanying video screens or other informational devices as an entertaining way for a slot machine player to receive a bonus. Of course, due to the limitations of the slot machines, a bonus is generally paid in additional credits or coin which, while admittedly generating additional interest in the game, can only go so far to increase the enjoyment and hence encourage repeated game play of the device. There is therefore a need for a bonusing system which produces a bonus which is randomly generated and includes a bonusing factor beyond mere credits.

One of the most popular forms of gambling currently available are the random drawing lotteries offered by many states, such as Powerball, Pick 5, The Big Game and other such random lottery drawings. Obviously, due to the nature of these drawings, it is much more difficult to win the significant amounts of money than the smaller jackpots available by playing slot machines or the like, but it is the appeal of these enormous amounts of money that lure people to participate in the various lotteries. Currently, there is little, if any, connection between slot machine play and random drawing or scratch ticket lottery play, although the two forms of gambling are often participated in by the same gambler. It is entirely possible that the synergy produced by being able to simultaneously participate in these two generally disassociated forms of gambling will increase the amount of game play of both forms of gambling. It is clear that when casinos enter a market, the amount of money spent on lotteries decreases. It is believed that creating a closer connection between casino operations and lottery games will increase the exposure for the lottery games, introducing them to a new group of consumers, thereby increasing revenues. Therefore, there is a need for a gambling connection between slot machines and lotteries which will permit a gambler to participate in the two forms of gambling generally simultaneously.

Some of the most popular forms of slot machines currently available on the market are found in Quartermania, Cool Millions and Megabucks, amongst other wide-area progressive links, which offer the opportunity for the player to win upwards of one million dollars on a single spin of the slot machine. Of course, though the chances of winning the top jackpot are very small, a player will play the game for that chance and also for the enjoyment of winning smaller prizes during game play. It is believed that the game play will be further enhanced by the addition of additional chances for the winning of even more significant amounts of money, such as through a Powerball jackpot or the like. There is therefore a need for an interface between a slot machine and a lottery system to permit the dispensing of lottery entries in response to particular reel combinations or particular events occurring on the slot machine board environment, or in response to actions or activities related to associated and peripheral equipment, thereby enhancing game play.

Therefore an object of the present invention is to provide a lottery system/electronic gaming device interface and gambling game.

Another object of the present invention is to provide a lottery system/electronic gaming device interface and gambling game which will permit the dispensing of an entry into a lottery drawing in response to a particular event or series of events occurring in the slot machine board environment or in and around the slot machine.

Another object of the present invention is to provide a lottery system/electronic gaming device interface and gambling game which will enhance game play and encourage additional game play for the gaming device player.

Another object of the present invention is to provide a lottery system/electronic gaming device interface and gambling game which is usable with many different types of gaming equipment, including but not limited to VLTs, linked VLT systems, slot machines with physical reels, video slot machines, central draw finite systems, bingo and keno machines and systems, table games and video poker devices.

Another object of the present invention is to provide a lottery system/electronic gaming device interface and gambling game which is usable with virtually any operable networking system, including but not limited to LAN, WAN, Internet, G3 cellular systems, radio-frequency (RF), line-of-sight, fiber-optic, wireless and networks using various protocols including TCP/IP.

Another object of the present invention is to provide a lottery system/electronic gaming device interface and gambling game which will receive event occurrence signals from the electronic gaming device, translate those event occurrence signals into discernable commands for a lottery system and command the lottery system to output a particular type of lottery entry in response to the occurrence of a particular event or series of events in or around the slot machine.

Finally, it is an object of the present invention to provide a lottery system/electronic gaming device interface and gambling game which is efficient in design and use and will encourage increased patronage of the electronic device and therefore of the lottery itself.

SUMMARY OF THE INVENTION

In some aspects, the invention relates to lottery system/slot machine interface system comprising: an electronic detector that detects selected slot machine event occurrences and outputs event occurrence notification signals upon detection of the selected event occurrences; an interface operative that detects the event occurrence notification signals from the detector, analyze the event occurrence notification signals and output lottery entry ticket printing operation commands; and a printer that receives the lottery entry ticket printing operation commands from the interface and prints a lottery entry ticket in connection with a state-run lottery.

Other aspects and advantages of the invention will be apparent from the following description and the appended claims.

BRIEF DESCRIPTION OF DRAWINGS

It should be noted that identical features in different drawings are shown with the same reference numeral.

DETAILED DESCRIPTION

The lottery system/electronic gaming device interface and gambling game of the present invention is primarily designed to enhance both the game play of an electronic gaming device in a casino or the like, the electronic gaming device usually being a slot machine, video slot machine or video poker game, video lottery terminal (VLT), linked VLT system, slot machine with physical reels, central draw finite system, bingo and/or keno machine or system, table game and lottery sales and exposure. The enhancement of game play occurs when a particular event or series of events occurs in the gaming device which results in the dispensing of a lottery ticket, preferably of the Powerball® or Lotto® type of on-line lottery game. In the preferred embodiment, an electronic gaming device such as a slot machine or video slot machine would be used as the base unit for the implementation of the present invention, and examples of the events which might trigger the dispensing of a lottery ticket would include the hitting of a specific reel combination, a preset amount of coin in, a certain level of game play, or any other detectable electronic device event or series of events.

Figure 1:
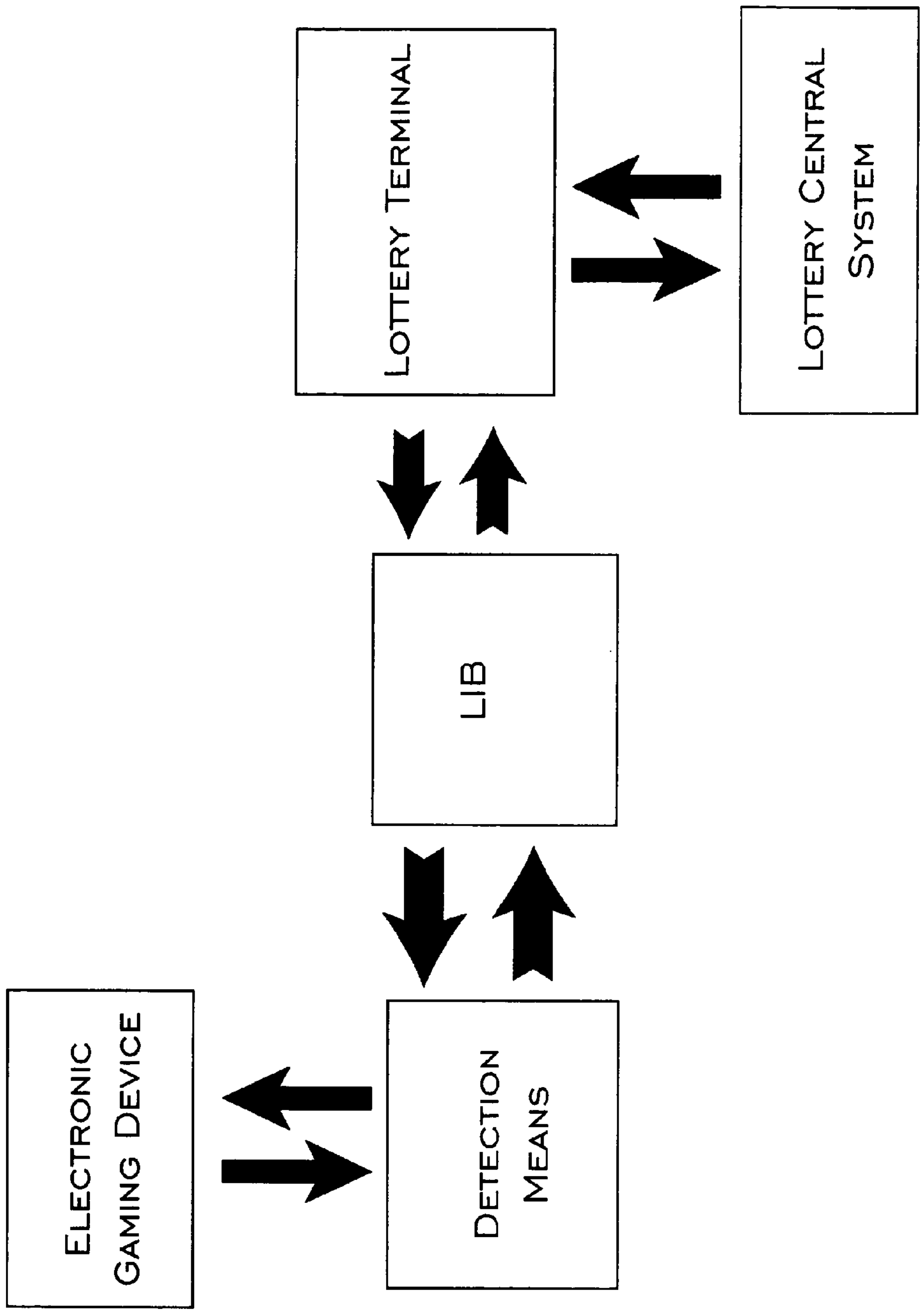
FIG. 1 is a block diagram showing the operation of the present invention.
Figure 2:
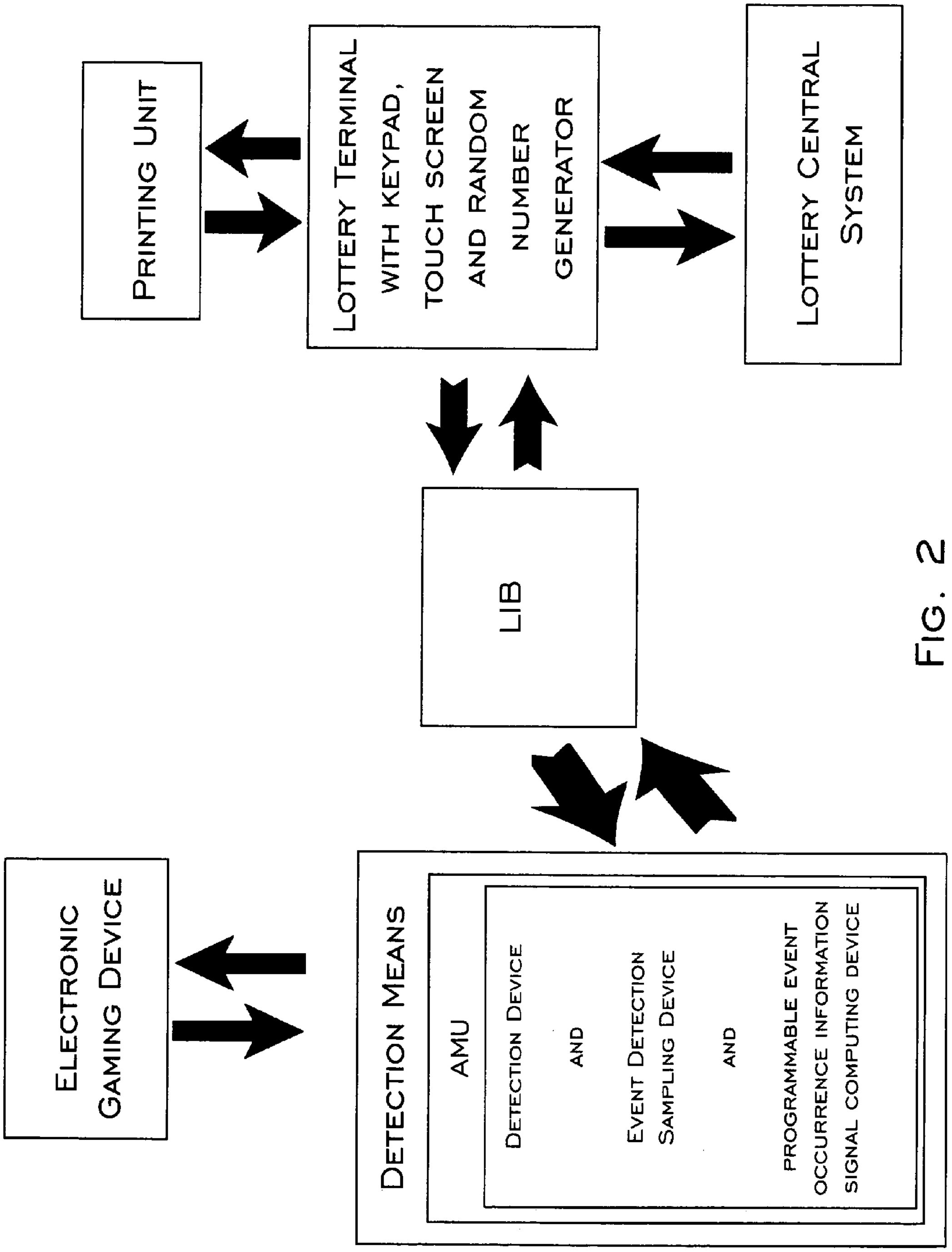
FIG. 2 is a lower-level block diagram of the operation of the present invention.

The preferred information flow of the present invention is shown in FIG. 1 with the invention including an activity monitoring unit or AMU which would be connected to the electronic gaming device for monitoring event occurrences in the electronic gaming device, preferably to specific electronic gaming device elements including but not limited to a digital display board, a reel position sensor and a hard meter harness. In the preferred embodiment, the AMU would be a programmable electronic activity detector and command generator which would include at least one detection device adapted to be connected to the electronic gaming device board, an event detection sampling device in information transmission connection with the detection device and a programmable event occurrence information signal computing device connected to the event detection sampling device operative to output command signals therefrom for commanding a connected lottery entry generating device to output a lottery entry in response to a specific occurrence or occurrences in or around the electronic gaming device. Of course, it is to be understood that it is the functional characteristics of the AMU which are critical to the present invention, i.e. the monitoring and signaling functions of the AMU, not the specific embodiment of the AMU. Therefore, any appropriate monitoring and signaling device, method, software, firmware or system could be substituted in the present invention, or such could be incorporated directly into the gaming device, such as being built into the electronic gaming device board, programmed into the software of the electronic gaming device itself or incorporated into the lottery system software or hardware. In the present invention, the AMU would be programmed to output command signals which can be interpreted by a connected lottery interface board or LIB which receives the command signals from the AMU and converts those signals into commands which are readable by a lottery system for outputting of lottery entries therefrom.

In the preferred embodiment, the LIB would preferably be a circuit board including a programmable microchip which would be programmed to accept the command signals from the AMU and output ticket generation commands to the lottery system. Of course, it should be noted that the LIB is representative of any equivalent system for providing the interface between the electronic gaming device and the lottery system. Therefore, any appropriate lottery interface system could be substituted in the present invention, or such a system could be incorporated directly into the gaming device, such as being built into the electronic gaming device board or programmed into the software of the electronic gaming device or electronic gaming device central system itself. Therefore, the LIB will preferably be connected to the AMU by a serial interface and the AMU will be connected to the electronic gaming device by a hardwire harness to connect to the appropriate sampling location or locations on the electronic gaming device board or where appropriate. Regarding the appropriate connections to properly connect the LIB to the lottery system, it is expected that such connections would be understood by one skilled in the art of gaming device connections, depending upon the type of lottery terminal being used and the connection requirements. It should be noted that the electrical connections of the LIB to the lottery system would be understood by one skilled in the art and are not critical to the present invention whereas the functionality of the LIB is critical to the present invention. For example, it is entirely possible and acceptable to connect the LIB to the lottery system at any feasible point within the lottery system, not only through the lottery terminal. Should the user of the present invention choose to connect to the lottery system at any other point within the system other than the lottery terminal, the present invention is easily adaptable to such use, and such connections would be understood by those skilled in the art.

The LIB may also be connected to other elements of the gaming side of the electronic gaming device, specifically including but not limited to connection to a Player Tracking Unit, the central Player Tracking Computer, the central accounting/security computer if different than the PTC or to a central system such as a "Central Draw Finite System", wherein the individual game outcomes are determined and then sent to the physical machine to be displayed to the player. Of course, various combinations of connections may be used with the present invention so long as the LIB functions as an interface between the electronic gaming device elements and a lottery system.

Figure 3:
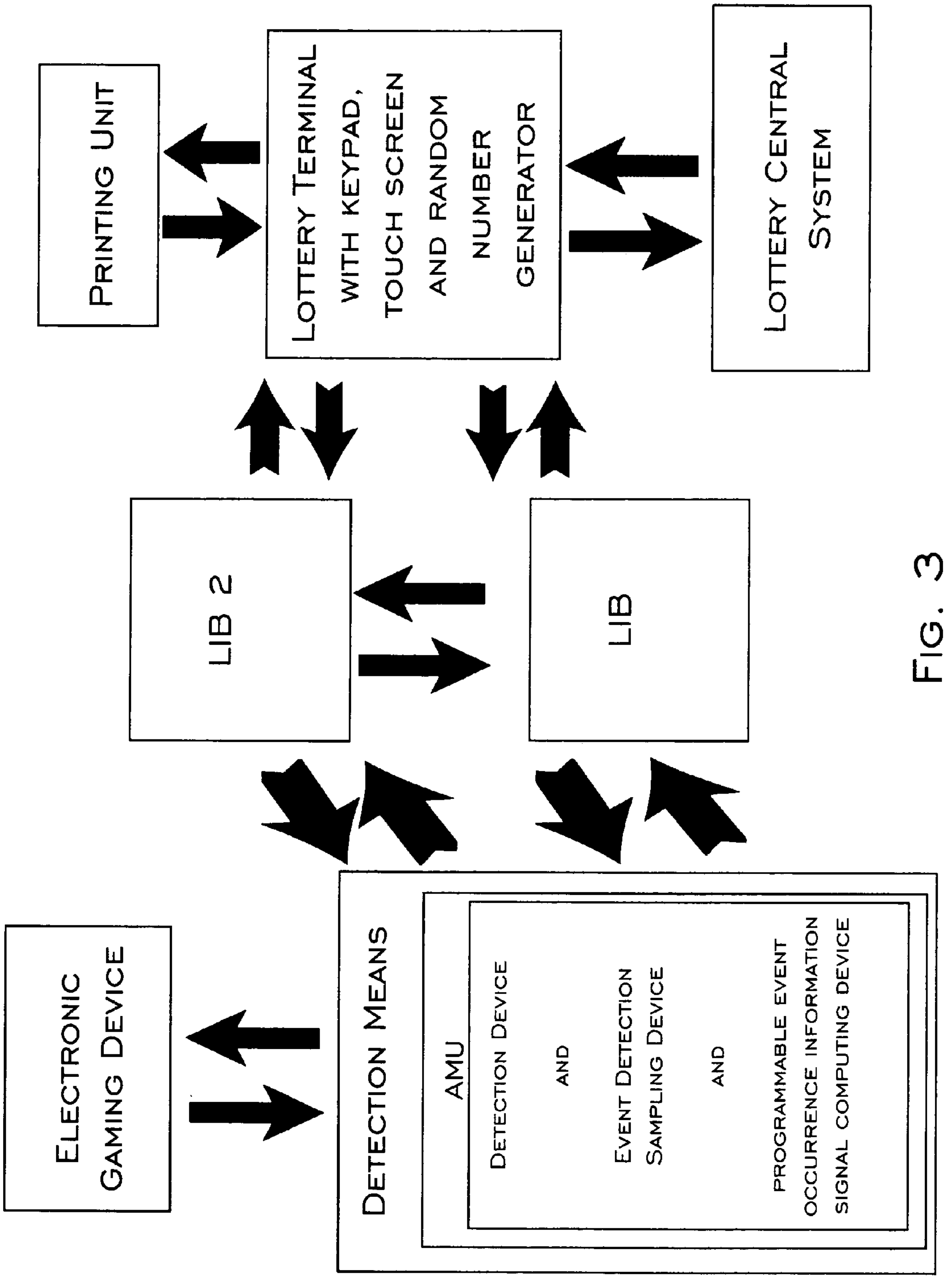
FIG. 3 is a lower-level block diagram showing the networking of the LIBs.

A further important feature of the LIB of the present invention is that the LIB's are networkable themselves. For example, as shown best in FIG. 3, a number of LIB units may be connected to one another for updating, accounting, security, bi-directional downloads, enabling and disabling of LIB's, controlling associated equipment and control of peripheral devices (e.g. signs, meters, lights, audio and video devices). These and other functions can be carried out with a central computer or through a "master" LIB in the network or through the lottery system's central computer, another lottery system computer or the electronic gaming device's central computer. This networking can be performed via a separate network system or may be "piggybacked" onto an existing network system depending on the specific design of the communication systems within the casino or gaming environment. Furthermore, the LIB or LIB network may be connected to an independent, private or casino-run lottery system which functions generally similarly to the large state-run lottery systems, or to any other desired lottery system to enhance game play and encourage increased wagering and gaming.

It should also be noted that the LIB may be used for accounting and security tracking functions for gaming devices, including such functions as tracking coin in, coin out, machine win, door open, jackpots and various tilts and other such electronic gaming device functions. Further, the LIB is programmable to include similar functions for a lottery system, including the number of tickets printed, paper jams, malfunctions, tilts and other such functions and activities.

Returning to the lottery terminal, in the case of Powerball®, for example, the lottery ticket terminal is preferably a MUSL (Multistate Lottery) proprietary terminal which is connected to the MUSL central system account in the common manner used in connection with lottery terminals. The lottery terminal would then print a lottery ticket through a, printing unit which, in the preferred embodiment, would be attached externally to or be housed within the electronic gaming device on or around which the triggering event or series of events had just occurred. In this manner, the player of the electronic gaming device may easily obtain a lottery ticket and/or voucher without leaving the vicinity of the electronic gaming device and without purchasing it separately. Of course, numerous variations of this setup are possible, as are the outputs of the lottery terminal depending on the associated lottery game. It is expected that one type of lottery game would be selected for participation, but that one game may require additional inputs through an associated keypad or touch screen, to enable a player to choose his or her own numbers for participation in the lottery. Other variations might include a randomly generated entry (Quick Pick) or the chosen numbers could correspond to numbers generated by the electronic gaming device as part of a coordinated gaming scheme designed for use with this invention. An additional number selection option for the lottery ticket would include providing a bonus screen on the electronic gaming device for manually or randomly selecting numbers for the lottery ticket. Of course, references to numerical values should be understood to include any and all characters usable for information transmission, such as letters and symbols, and such are usable with the present invention.

The AMU is programmed to recognize the occurrence of a specific event or series of events, and when that specific event or series of events occur(s), the AMU recognizes that occurrence and forwards an event notification signal to the LIB. The LIB then receives those signals and analyzes and translates those signals to signal the lottery system to output a lottery entry, if so commanded by the AMU. If so, the LIB outputs a lottery entry generation command to the lottery system. The system in turn commands the entry to be dispensed at the output location corresponding to the electronic gaming device at which the event or series of events occurred, thus allowing game play to continue uninterrupted and therefore not affecting the speed of game play. The system will function with the AMU being programmed to determine which events will cause the generation of lottery tickets, but it is the LIB which is vital to enable the signaling of the lottery system to output at least one entry ticket.

At the present time, most, if not all, of the state-run lottery computers have built-in "down-time" during which time the maintenance on the system may be performed or implementation of new and/or modified software may be done. Also, unforeseen down-time can occur in the lottery system due to occurrence of system errors. In any event, during any down-time, lottery tickets cannot be printed by remote terminals. However, as most casinos operate on a 24-hour basis, it is virtually guaranteed that at least one event or series of events will occur on a electronic gaming device which induces the printing of a lottery ticket during the down-time of the lottery system. In this situation, the lottery terminal, lottery printer or alternative printer would be commanded to print a voucher ticket which the player of the electronic gaming device could later redeem for a lottery ticket at a time when the system is once again up and running. Alternatively, the central lottery system would periodically generate a pool of entries to be used during a system shut down, whether the shut down is scheduled or is due to system failure, and would preferably be one of the initial steps in initializing a new drawing period. An entry from this pool would then be output to the player during the down-time period. Unused entries from this pool would then be removed or purged from the subsequent or related drawing. Of course, any acceptable type of printed or outputted indicia signifying entry into a lottery event can be substituted for the "tickets" or "vouchers" previously described, each of which would be understood by one skilled in the art of lottery gaming.

Of course, it is to be understood that numerous modifications, substitutions and additions may be made to the present invention which are within the intended broad scope of this disclosure. For example, many different types of lottery systems from many different manufacturers may be connected to the invention. Those different lottery systems may have different programming installed in the microchips of any of the command generator units and the particular hardwiring used to connect the device to the lottery terminal may also be different. Also, although the present invention has been described as being used in connection with a electronic gaming device, it should be noted that the AMU and LIB of the present invention are programmable for operation with virtually any type of electronic device, including video slot machines, video lottery terminals, video poker games, video keno games, vending machines, arcade machines, ATMs and virtually any other electronic device which can be connected to the AMU and LIB. Furthermore, the present invention may be retrofitted onto existing electronic gaming devices due to the design of the AMU, and therefore can be used in almost any gaming situation. Finally, although the present invention has been described as commanding the dispensing of lottery tickets and/or vouchers, it should be noted that numerous other types of lottery-related products may be dispensed in response to event occurrences on the electronic device, such as pickle cards, scratch tickets, keno tickets, gaming tokens, raffle entries and other such items.

There has therefore been shown and described a lottery system/electronic gaming device interface and gambling game which accomplishes at least all of its intended objectives.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. A lottery system/slot machine interface system comprising:

an electronic detector that detects selected slot machine event occurrences and outputs event occurrence notification signals upon detection of the selected event occurrences;

an interface operative to detect the event occurrence notification signals from the detector, analyze the event occurrence notification signals and output lottery entry ticket printing operation commands; and a printer that receives the lottery entry ticket printing operation commands from the interface and prints a lottery entry ticket in connection with a state-run lottery.

* * * * *